US012712926B2

(12) United States Patent
Bisht et al.

(10) Patent No.: US 12,712,926 B2
(45) Date of Patent: Aug. 18, 2026

(54) NETWORK DEVICE AND METHOD FOR A UNIVERSAL CENTRAL EXCHANGE

(71) Applicant: JIO PLATFORMS LIMITED, Ahmedabad (IN)

(72) Inventors: Birendra Singh Bisht, Navi Mumbai (IN); Harbinder Pal Singh Saini, Navi Mumbai (IN); Anurag Sinha, Mumbai (IN); Sandeep Gupta, Dwarka (IN); Mangesh Shantaram Kale, Navi Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 523 days.

(21) Appl. No.: 18/247,449

(22) PCT Filed: Mar. 16, 2023

(86) PCT No.: PCT/IB2023/052579
§ 371 (c)(1),
(2) Date: Mar. 31, 2023

(87) PCT Pub. No.: WO2023/187534
PCT Pub. Date: Oct. 5, 2023

(65) Prior Publication Data

US 2025/0016206 A1 Jan. 9, 2025

(30) Foreign Application Priority Data

Mar. 30, 2022 (IN) ............................ 202221018948

(51) Int. Cl.
*H04L 65/1069* (2022.01)
*H04L 65/1045* (2022.01)
(Continued)

(52) U.S. Cl.
CPC ...... *H04L 65/1069* (2013.01); *H04L 65/1045* (2022.05); *H04L 65/1053* (2013.01);
(Continued)

(58) Field of Classification Search
CPC ............. H04L 65/1069; H04L 65/1104; H04L 65/1053; H04M 3/44
(Continued)

(56) References Cited

U.S. PATENT DOCUMENTS 8,989,179 B2 3/2015 Buckley et al.
9,712,341 B2 7/2017 Nas
(Continued)

FOREIGN PATENT DOCUMENTS

KR 2008006188 A * 7/2006

OTHER PUBLICATIONS

International Search Report, PCT/IB2023/052579, mailed Jun. 19, 2023, Total pp. 03.

*Primary Examiner* — Jirapon Tulop
(74) *Attorney, Agent, or Firm* — FINNEGAN, HENDERSON, FARABOW, GARRETT & DUNNER LLP

(57) ABSTRACT

The present disclosure generally relates to wireless communication systems, more particularly to network device and method for universal Central exchange (Centrex). Network device receives short code dialed by first user from a first user device to a second user device, the second user device to the second user device, and Inter/Intra circle first user device. Further, the network device determines, if received short code is SIP trunking code or IP Centrix/Centrex code, and converts the received short code to relevant Uniform Resource Identifier (URI). Thereafter, the network device performs E. 164 number to URI mapping (ENUM) or Mobile Number Portability (MNP) for the URI, and trans-
(Continued)

mits the SIP INVITE request for inviting the second associated with first user device for session. Further, network device processes call between first user and second user, based on receiving call by second user.

18 Claims, 8 Drawing Sheets

(51) Int. Cl.
*H04L 65/1053* (2022.01)
*H04L 65/1104* (2022.01)
*H04M 3/44* (2006.01)
*H04L 65/1016* (2022.01)

(52) U.S. Cl.
CPC .......... *H04L 65/1104* (2022.05); *H04M 3/44* (2013.01); *H04L 65/1016* (2013.01)

(58) Field of Classification Search
USPC .......................................................... 370/259
See application file for complete search history.

(56) References Cited

U.S. PATENT DOCUMENTS

2007/0206613 A1 9/2007 Silver et al.
2007/0274289 A1* 11/2007 Buckley .................. H04L 12/66 370/356
2008/0273526 A1* 11/2008 Michalski ............. H04M 15/80 370/352
2012/0002548 A1* 1/2012 Walstrom ............ H04L 65/1016 370/235

* cited by examiner

NETWORK DEVICE AND METHOD FOR A UNIVERSAL CENTRAL EXCHANGE

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to wireless communication systems. More particularly, the present disclosure relates to a network device and a method for Universal Central exchange (Centrex).

BACKGROUND OF THE INVENTION

The following description of the related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In general, Internet protocol Multimedia Subsystem (IMS) may have three main layers, which may include transport, control, and service/application layer. The IMS may support multiple application servers for telephony services in the service/application layer. An IMS application may provide a specific service to the end-user. The IMS end-user services may include multiparty gaming, video-conferencing, messaging, community services, presence, content sharing, and the like. Depending on the implementation, a Telephony Application Server (TAS) may be required that can host one or many different applications. In the IMS, there can be three types of TAS in the service/application layer depending on the requirements and for different applications/services such as, (a) Session Initiation Protocol (SIP) application server, (b) Open Service Access (OSA) application server, and (c) CAMEL service environment. All the above-mentioned servers may be combined in one unit which can also be called a TAS. The IMS architecture may enable an IMS service provider to deploy multiple application servers in the same domain. Different application servers can be deployed for different applications. TAS integrates voice, video, instant messaging, presence, mobility, conferencing, and collaboration over any network and any device. A Central exchange (Centrex) or a centralized user switch) service divides users into a basic user group on the switch of a telephone office or a telecom company, and provides various functions of the user-specific switch to the user group, while also providing some unique service features. The internal and external exchange of users are concentrated in the switch of the telephone office or the telecommunication company. Traditional users such as ones belonging to a Public Switched Telephone Network (PSTN), a Global System for Mobile Communications (GSM), and a Code Division Multiple Access (Code Division Multiple Access), may be included in a group.

In a scenario, consider, for example, an organization with few phones working through Internet Protocol Private Branch Exchange (IP PBX) at one location and the same organization with Plain Old Telephone Service (POTS) phones working through old legacy Primary Rate Interface (PRI) connectivity-based PBX at other location. Further, to upgrade to the contemporary systems and technologies, the organization may need to replace the old legacy PBX with IP PBX which leads to additional cost of IP PBX for the migration. Further, there may be no provision of short code dialing between IP PBX and PBX phones. In addition, there may be no Centrex service for short code dialing between the PBX and IP PBX, or Centrex and IP Centrex.

Therefore, there is a need to arrive at a network device and a method for providing a universal Central exchange (Centrex) that addresses at least the above-mentioned problems.

OBJECTS OF THE PRESENT DISCLOSURE

Some of the objects of the present disclosure, which at least one embodiment herein satisfy are as listed herein below.

In a general aspect, the present disclosure provides a network device and a method for Universal Central exchange (Centrex).

In another aspect, the present disclosure provides a network device which would be integrated with an operator's Internet protocol Multimedia Subsystem (IMS) core network.

In another aspect, the present disclosure provides a universal Centrex service as a value-added service over any of the existing voice services namely SIP Trunk, Centrex, IP Centrex, and society Centrex.

In another aspect, the present disclosure enables the universal Centrex service with a short digit dialing between Centrex/IP Centrex users and SIP trunking users, SIP trunking to SIP trunking users, and inter/intra circle Centrex/IP Centrex users within the same city or across the nation.

In yet another aspect, the present disclosure enables migration of a Plain Old Telephone Service (POTS) phone over IP without incurring the cost of Private Branch Exchange (PBX) and also customers can enjoy the benefit of dialing between Internet Protocol (IP) PBX and new universal Centrex users.

In another aspect, the present disclosure supports short digit dialing between Centrex/IP Centrex user to SIP trunking user and SIP trunking to SIP trunking or Inter/Intra-circle Centrex/IP Centrex user.

In another aspect, the present disclosure enables private numbering patterns (2/3/4/5/6 digit) country-wide.

In another aspect, the present disclosure merges multiple SIP trunks with one pilot number (same location, same authorized signatory, same billing identity, and the like).

In another aspect, the present disclosure enables an existing setup as well as new setups under one Centrex group.

SUMMARY

This section is provided to introduce certain objects and aspects of the present invention in a simplified form that are further described below in the detailed description. This summary is not intended to identify the key features or the scope of the claimed subject matter.

In an aspect, the present disclosure provides a network device for a universal central exchange (Centrex). The network device receives a short code dialed by a first user from at least one of, a first user device to a second user device, the second user device to the second user device, and Inter/Intra circle first user device. The second user device is communicatively coupled to one or more Internet Protocol Private Branch Exchange (IP PBX). Further, the network device determines, if the received short code is at least one of a SIP trunking code or an IP Centrix/Centrex code. Furthermore, the network device converts the received short code to a relevant Uniform Resource Identifier (URI) corresponding to the at least one of a SIP trunking code or an IP Centrix/Centrex code, based on the determination. The short code corresponds to at least one of a fixed-line and a mobile number. Thereafter, the network device performs at least one of an E. 164 number to URI mapping (ENUM) and a Mobile Number Portability (MNP) for the URI. Further, the network device transmits a SIP INVITE request for inviting a second user associated with at least one of the first user devices for a session. The SIP INVITE includes a URI address along with a domain name associated with the second user. Furthermore, the network device transmits a Caller Ring Back Tones (CRBT) to the first user, while ringing the second user associated with at least one of the first user device, and the second user device, upon receiving a SIP INVITE response from the second user. Further, the network device processes a call between the first user and the second user, based on receiving the call by the second user, after ringing the second user associated with at least one of the first user devices, and the second user device.

In an embodiment, the short code is received from at least one of the first user device and the second user device via an Enterprise Session Border Controller (ESBC), Proxy-Call Session Control Function (PCSCF), a Serving-Call Session Control Function (SCSCF), where the ESBC forwards the traffic to Internet protocol Multimedia Subsystem (IMS) core network, which is common IMS architecture being deployed in the operator environment.

In an embodiment, at least one of the SIP trunking codes or the IP Centrix/Centrex code is determined based on prefix associated with the short code dialed by the first user.

In an embodiment, the call is originated from an Enterprise Session Border Controller (ESBC), and the network device holds all numbers configuration related to SIP trunk, Centrex/IP Centrex, and a respective Closed User Group (CUG) definition.

In an embodiment, the processor may merge multiple second user devices with one pilot number, wherein the pilot number is associated with the same location, same authorized signatory, and same billing identity.

In an embodiment, the processor may transmit a Credit-Control-Request (CCR) to an Online Charging Server (OCS), and receive back a Credit-Control-Answer (CCA) from the OCS, upon performing at least one of the ENUM and the MNP for the URI, and after SIP INVITE to the second user associated with at least one of the first user device and the second user device.

In an embodiment, the processor may transmit a Location Information Request (LIR), via the SCSCF, to an Interconnect Border Control Function (IBCF) associated with at least one of the first user devices and the second user device of the first user, for first user information, upon receiving the CCA from the OCS, and receive a Location Information Answer (LIA) from the IBCF associated with at least one of the first user devices, the second user device of the first user, with the first user information, via an Interrogating Call Session Control Function (ICSCF).

In an embodiment, the first user device corresponds to a central exchange (Centrex)/Internet Protocol (IP) Centrex user device, and the second user device corresponds to a Session Initiation Protocol (SIP) trunking user device.

In another aspect, the present disclosure further provides a method for a universal central exchange (Centrex). The method includes receiving a short code dialed by a first user from at least one of, a first user device to a second user device, the second user device to the second user device, and Inter/Intra circle first user device. The second user device is communicatively coupled to one or more Internet Protocol Private Branch Exchange (IP PBX). Further, the method includes determining, if the received short code is at least one of a SIP trunking code or an IP Centrix/Centrex code. Furthermore, the method includes converting the received short code to a relevant Uniform Resource Identifier (URI) corresponding to the at least one of a SIP trunking code or an IP Centrix/Centrex code, based on the determination. The short code corresponds to at least one of a fixed-line and a mobile number. Thereafter, the method includes performing at least one of an E. 164 number to URI mapping (ENUM) and a Mobile Number Portability (MNP) for the URI. Further, the method includes transmitting a SIP INVITE request for inviting a second user to associate with at least one of the first user devices for a session. The SIP INVITE includes a URI address along with a domain name associated with the second user. Furthermore, the method includes transmitting a Caller Ring Back Tones (CRBT) to the first user, while ringing the second user associated with at least one of the first user devices, and the second user device, upon receiving a SIP INVITE response from the second user. Further, the method includes processing a call between the first user and the second user, based on receiving the call by the second user, after ringing the second user associated with at least one of the first user devices, and the second user device.

In another aspect, the present disclosure relates to a user equipment for a universal central exchange. The user equipment includes a processor coupled to a processor of a network device, and a memory coupled to the processor. The memory includes processor-executable instructions to cause the processor to transmit a short code dialed by a first user associated with the user equipment to a second user associated with a second user equipment, where the second user equipment is communicatively coupled to one or more IP PBX, receive a CRBT, and process a call between the first user and the second user.

In another aspect, the present disclosure relates to a non-transitory computer-readable medium including processor-executable instructions that cause a processor to perform the steps of the method, as discussed above.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that the invention of such drawings includes the invention of electrical components, electronic components, or circuitry commonly used to implement such components.

Figure 1:
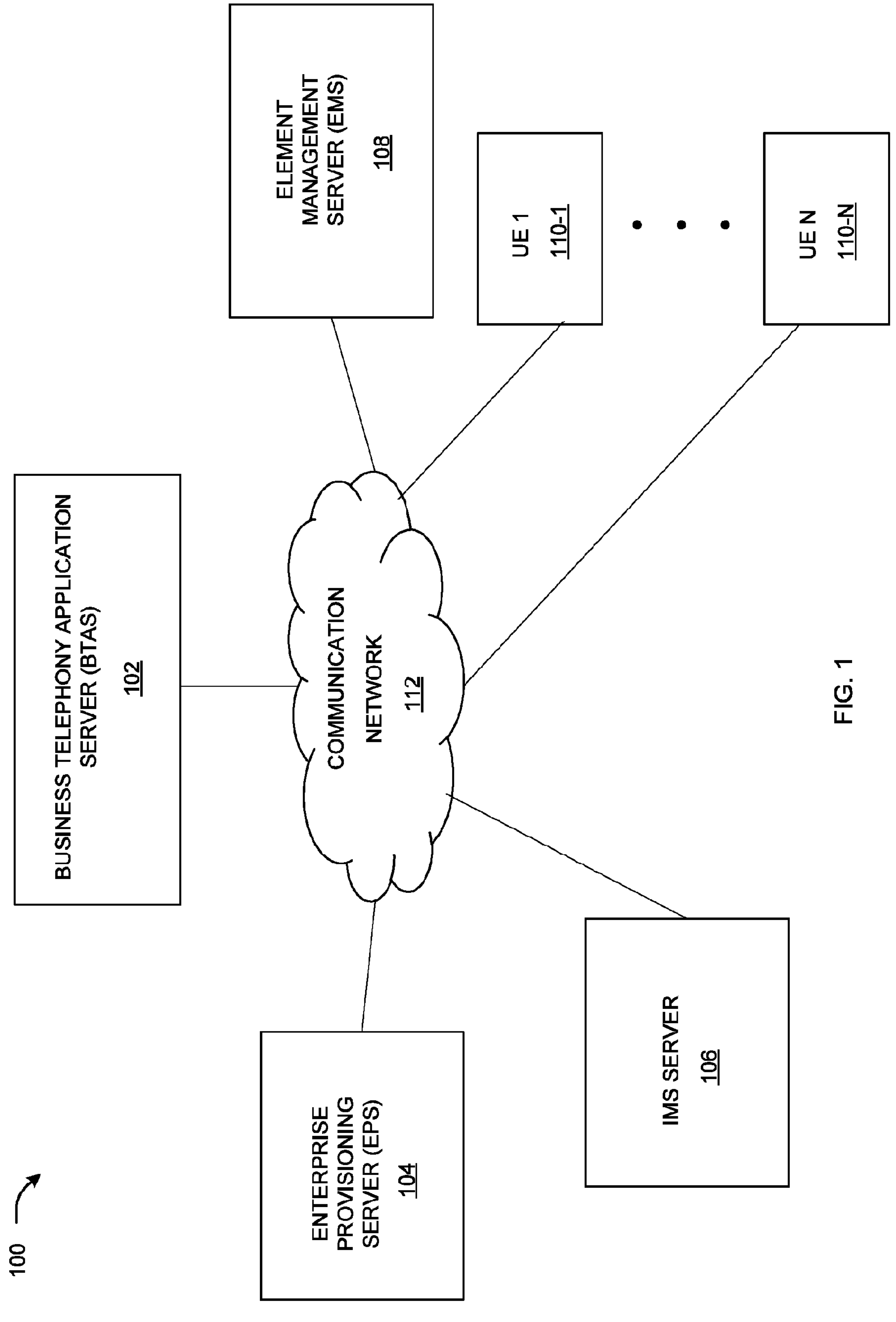
FIG. 1 illustrates an exemplary network architecture block diagram representation in which or with which the system of the present disclosure can be implemented for universal Central exchange (Centrex), in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Various embodiments of the present disclosure provide a network device and a method for Universal Central exchange (Centrex). The present disclosure provides a network device which would be integrated with an operator's Internet protocol Multimedia Subsystem (IMS) core network. The present disclosure provides a universal Centrex service as a value-added service over any of the existing voice services namely SIP Trunk, Centrex, IP Centrex, and society Centrex. The present disclosure enables the universal Centrex service with a short digit dialing between Centrex/IP Centrex users and SIP trunking users, SIP trunking to SIP trunking users, and inter/intra circle Centrex/IP Centrex users within same city or across the nation. The present disclosure enables migration of a Plain Old Telephone Service (POTS) phone over IP without incurring the cost of Private Branch Exchange (PBX) and also customers can enjoy the benefit of dialing between Internet Protocol (IP) PBX and the new universal Centrex users. The present disclosure supports short digit dialing between Centrex/IP Centrex user to SIP trunking user and SIP trunking to SIP trunking or Inter/Intra-circle Centrex/IP Centrex user. The present disclosure enables private numbering patterns (e.g., 2/3/4/5/6 digit) country-wide. The present disclosure merges multiple SIP trunks with one pilot number (same location, same authorized signatory, same billing identity, and the like). The present disclosure enables an existing setup as well as new setups under one Centrex group.

Referring to FIG. 1 that illustrates an exemplary network architecture block diagram for the universal Central exchange (Centrex) system (100) (also referred to as network architecture (100)) in which or with which a network device (102) of the present disclosure can be implemented, in accordance with an embodiment of the present disclosure. The network device may be a Business Telephony Application Server (BTAS) (hereinafter interchangeably referred to as network device or BTAS). The network device/BTAS (102) may be integrated with a vendor Internet protocol Multimedia Subsystem (IMS) server (106) of a core network. The core network may include, but is not limited to, a Third Generation (3G) network, a Fourth Generation (4G) network, a Fifth Generation (5G) network, a Sixth Generation (6G) network, a Wireless Fidelity (Wi-Fi) network, any other wireless networks or combination thereof, and the like. The BTAS (102) may provide services such as Session Initiation Protocol (SIP) trunking and Internet Protocol (IP) Central exchange (Centrex) service to users. The BTAS (102) may be integrated with the IMS core network and other application servers to provide supplementary services such as, but not limited to, Closed User Group (CUG), short code dialing, conferencing, and the like. The BTAS (102) may be a SIP application server that can be combined in different ways for different SIP network solutions. The various functional components of BTAS (102) may include, but are not limited to, SIP application server with enterprise features, Access elements, and clients such as IP telephones, IP Private Branch Exchange (PBX), Enterprise Session Border Controllers (ESBC), and the like, operation, administration and management via Element Management Server (EMS) (108), provisioning servers, IMS network, and the like.

The BTAS (102) may be further operatively coupled to one or more User Equipment (UE) (110-1, . . . , 110-N) (collectively referred to as UEs (110) and individually referred to as UE (110)) associated with users, via a communication network (112). The UE (110) may be connected to the BTAS (102) via the IMS server (106). The BTAS (102) may be communicatively coupled to an entity (not shown in FIG. 1). The entity may include, but is not limited to, a company, an organization, a network operator, a vendor, a retailer, a storage facilitator, a university, a lab facility, a business enterprise, a defense facility, or any other secured facility. Further, the entity may analyze the data or output from the BTAS (102). In some implementations, the system (110) may also be associated with the computing device.

Although FIG. 1 shows exemplary components of the network architecture (100), in other implementations, the network architecture (100) may include fewer components, different components, differently arranged components, or additional functional components than depicted in FIG. 1. Additionally, or alternatively, one or more components of the network architecture (100) may perform functions described as being performed by one or more other components of the network architecture (100).

The BTAS (102) may be implemented in, but are not limited to, an electronic device, a mobile device, a wireless device, a wired device, a server, and the like. Such server may include, but is not limited to, a standalone server, a remote server, a cloud server, a dedicated server, and the like.

Figure 2:
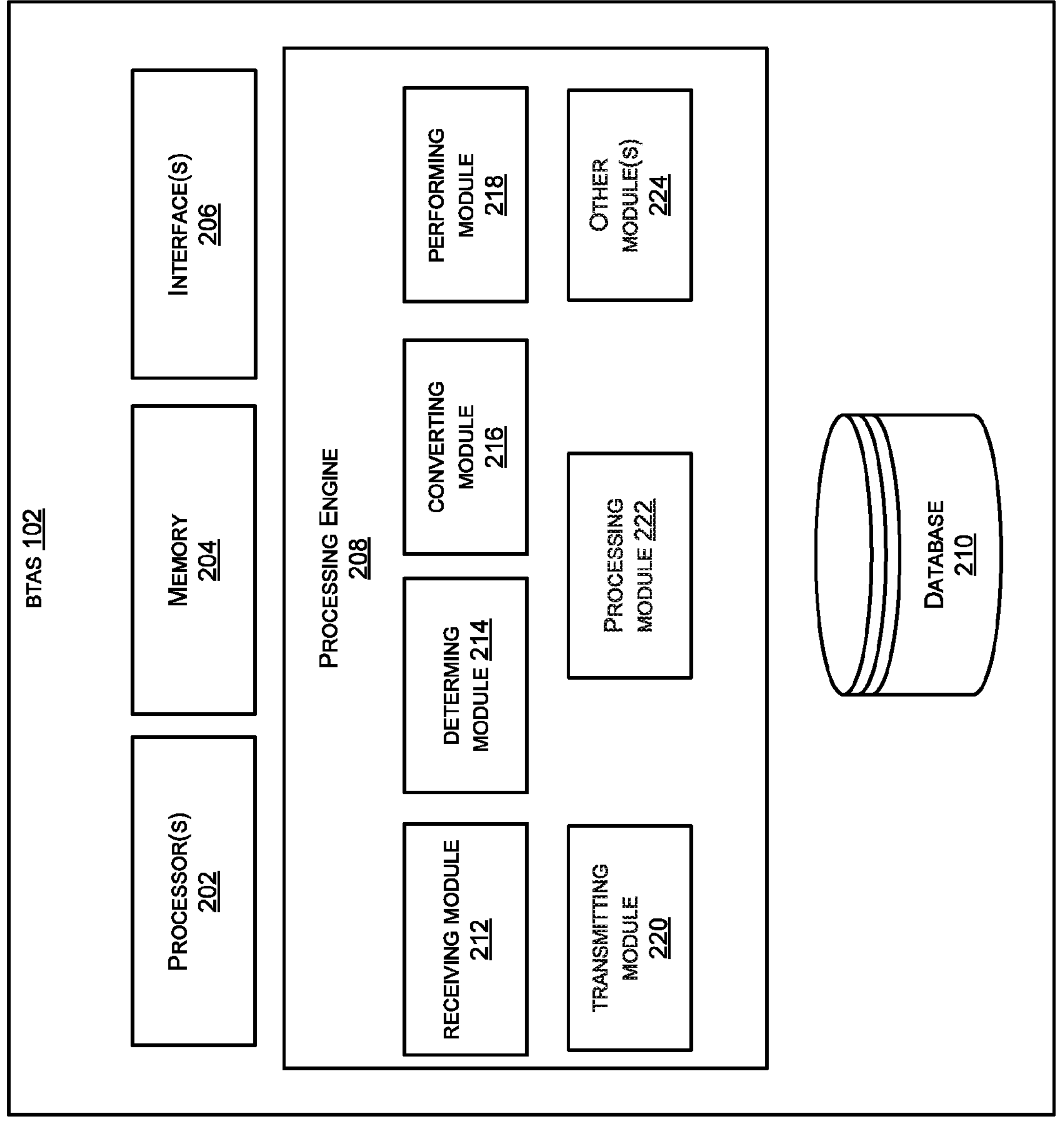
FIG. 2 illustrates an exemplary block diagram representation of a server for universal Central exchange (Centrex), in accordance with an embodiment of the present disclosure.

In an embodiment, the BTAS (102) may include one or more processors coupled with a memory, wherein the memory may store instructions which when executed by the one or more processors may cause the BTAS (102) to provide a universal Central exchange (Centrex). An exemplary representation of the BTAS (102) for universal Central exchange (Centrex), in accordance with an embodiment of the present disclosure, is shown in FIG. 2. In an aspect, the BTAS (102) may include one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the BTAS (102). The memory (204) may be configured to store one or more computer-readable instructions or routines in a non-transitory computer-readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the BTAS (102) may include an interface(s) (206). The interface(s) (206) may comprise a variety of interfaces, for example, interfaces for data input and output devices, referred to as I/O devices, storage devices, and the like. The interface(s) (206) may facilitate communication of the centralized server (110). The interface(s) (206) may also provide a communication pathway for one or more components of the BTAS (102). Examples of such components include, but are not limited to, processing unit/engine(s) (208) and a database (210).

The processing unit/engine(s) (208) may be implemented as a combination of hardware and programming (for example, programmable instructions) to implement one or more functionalities of the processing engine(s) (208). In the examples described herein, such combinations of hardware and programming may be implemented in several different ways. For example, the programming for the processing engine(s) (208) may be processor-executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In accordance with such examples, the BTAS (102) may include the machine-readable storage medium storing the instructions and the processing resource to execute the instructions, or the machine-readable storage medium may be separate but accessible to the BTAS (102) and the processing resource. In other examples, the processing engine(s) (208) may be implemented by electronic circuitry.

The processing engine (208) may include one or more modules/engines selected from any of a receiving module (212), a receiving module (214), a converting module (216), a performing module (218), a transmitting module (220), a processing module (222), and other module(s) (224). The processing engine (208) may further be edge-based micro service event processing, but not limited to the like.

In an embodiment, the receiving module (212) may receive a short code dialed by a first user. The first user may dial from at least one of, a first user device to a second user device, the second user device to the second user device, and Inter/Intra circle first user device. The first user device may be a central exchange (Centrex)/Internet Protocol (IP) Centrex user device, and the second user device may be a Session Initiation Protocol (SIP) trunking user device. Such device may be the UE (110) (hereinafter the first user device may be referred to as Centrex/IP Centrex user device/first user device/UE, and the second user device may be referred to as SIP trunking device/second user device/UE). The second/SIP trunking user device (110) may be communicatively coupled to one or more Internet Protocol Private Branch Exchange (IP PBX) (not shown in FIG. 1). The short code may be received from at least one of the Centrex/IP Centrex user device, and the SIP trunking user device via an Enterprise Session Border Controller (ESBC), Proxy-Call Session Control Function (PCSCF), a Serving-Call Session Control Function (SCSCF), the ESBC forwards the traffic to Internet protocol Multimedia Subsystem (IMS) core network, which is common IMS architecture being deployed in the operator environment.

In an embodiment, the determining module (214) may determine, if the received short code is at least one of a SIP trunking code or an IP Centrix/Centrex code. In an embodiment, the converting module (216) may convert the received short code to a relevant Uniform Resource Identifier (URI) corresponding to the at least one of a SIP trunking code or an IP Centrix/Centrex code, based on the determination. The short code corresponds to at least one of a fixed-line and a mobile number. The SIP trunking code or the IP Centrix/Centrex code may be determined based on the prefix associated with the short code dialed by the first user.

In an embodiment, the performing module (218) may perform at least one of an E. 164 number to URI mapping (ENUM) and a Mobile Number Portability (MNP) for the URI. In an embodiment, the transmitting module (220) may transmit a Credit-Control-Request (CCR) to an Online Charging Server (OCS), and receive back a Credit-Control-Answer (CCA) from the OCS, upon performing at least one of the ENUM and the MNP for the URI.

In an embodiment, the transmitting module (220) may transmit a Location Information Request (LIR), via the SCSCF, to an Interconnect Border Control Function (IBCF) associated with at least one of the Centrex/IP Centrex user devices, and the SIP trunking user device of the first user, for first user information, upon receiving the CCA from the OCS. Further, the receiving module (212) may receive a Location Information Answer (LIA) from the IBCF associated with at least one of the Centrex/IP Centrex user devices, the SIP trunking user device of the first user, with the first user information, via an Interrogating Call Session Control Function (ICSCF).

In an embodiment, the transmitting module (220) may transmit a SIP INVITE request for inviting a second user associated with at least one of the Centrex/IP Centrex user devices for a session, wherein the SIP INVITE comprises a URI address along with domain name associated with the second user.

In an embodiment, the BTAS (102) may merge multiple SIP trunking user devices with one pilot number. The pilot number is associated with the same location, same authorized signatory, and same billing identity.

In an embodiment, the transmitting module (222) may transmit a Caller Ring Back Tones (CRBT) to the first user, while ringing the second user associated with at least one of the Centrex/IP Centrex user devices, and the SIP trunking user device, upon receiving a SIP INVITE response from the second user.

In an embodiment, the processing module (224) may process a call between the first user and the second user, based on receiving the call by the second user, after ringing the second user associated with at least one of the Centrex/IP Centrex user device, and the SIP trunking user device. The call may be originated from an Enterprise Session Border Controller (ESBC) (not shown in FIG. 1 and FIG. 2), and the BTAS (102) holds all numbers configuration related to SIP trunk, Centrex/IP Centrex, and a respective Closed User Group (CUG) definition.

In an embodiment, the UE (110) or the computing device (not shown in FIG. 1 and FIG. 2) may communicate with the BTAS (102) via a set of executable instructions residing on any operating system. In an embodiment, the electronic devices may include, but are not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as a touchpad, touch-enabled screen, electronic pen and the like. It may be appreciated that the electronic devices may not be restricted to the mentioned devices and various other devices may be used. A smart computing device may be one of the appropriate systems for storing data and other private/sensitive information.

Figure 3:
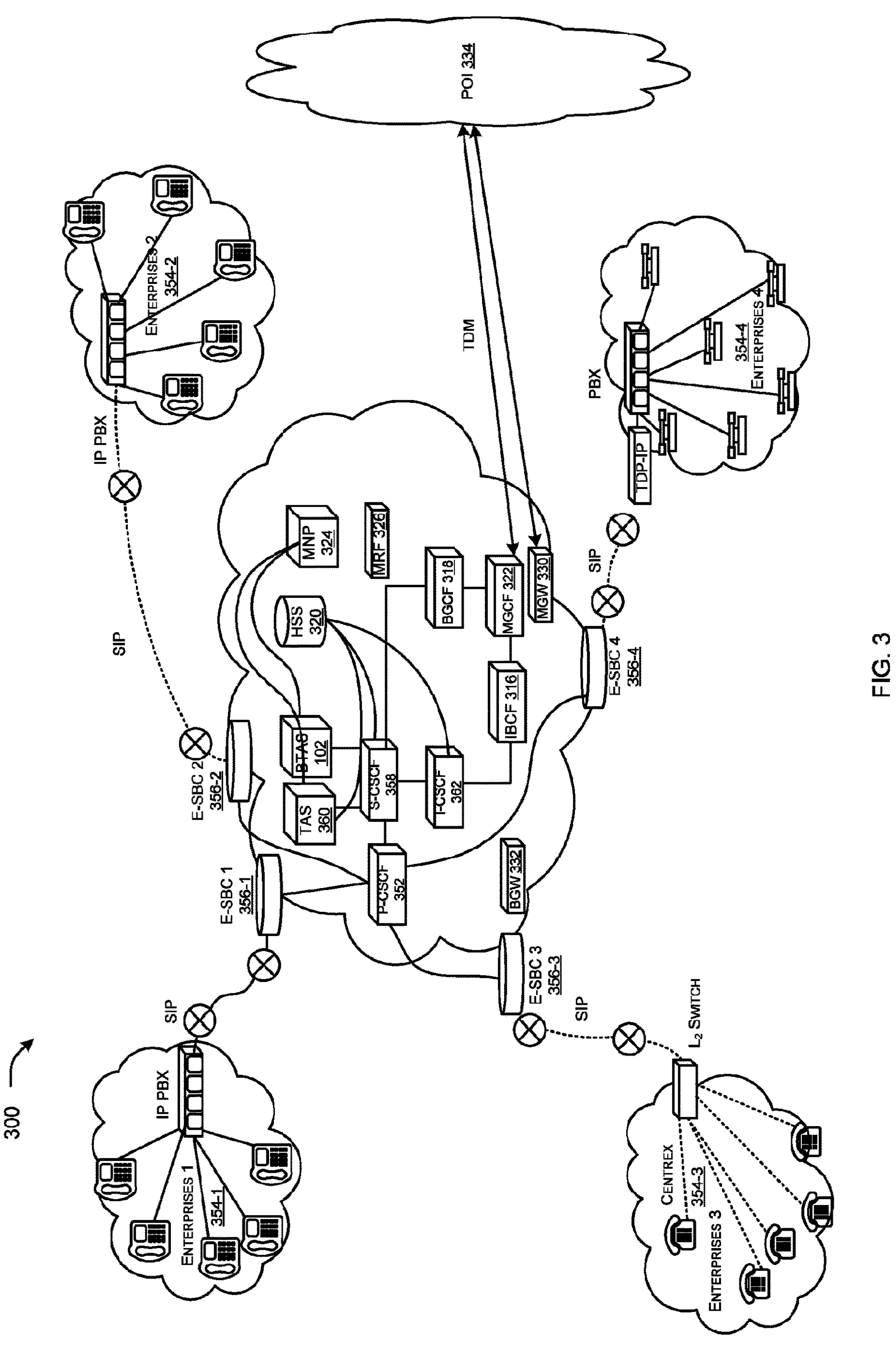
FIG. 3 illustrates an exemplary block diagram representation of a network service provided to multiple entities or enterprises, in accordance with an embodiment of the present disclosure.

FIG. 3 illustrates an exemplary block diagram representation of a network service provided to multiple entities or enterprises, in accordance with an embodiment of the present disclosure. The network service (corresponding to 112 in FIG. 1) may be provided to multiple entities or enterprises, such as, for example, enterprise-1 (354-1), enterprise-2 (354-2), enterprise-3 (354-3), and enterprise-4 (354-4) (collectively referred as enterprises (354) and individually referred as enterprise (354)). In an embodiment, at least one of the enterprises 354 may include an IP Private Branch Exchange (IP PBX) to enable switching calls between UEs (110) on local lines, wherein each enterprise (154) may communicate with the communication network/servers through an Enterprise Session Border Controllers (ESBC) (356-1, 356-2, 356-3, 356-4) (collectively referred as ESBC (356)). As shown in FIG. 1, each enterprise, for example, enterprise-1 (354-1), enterprise-2 (354-2), enterprise-3 (354-3), and enterprise-4 (354-4) may be facilitated with the network service (such as 4G/5G/6G network service) through ESBC (356-1, 356-2, 356-3 and 356-4) respectively. The ESBC (356) may be an executable set of instructions for enabling connectivity and security pertaining to the network of the enterprises and service providers. The IP PBX may be a Private Branch Exchange (PBX) or a telephone switching system within an enterprise, which may enable, for example, switching calls between users within an enterprise. In an embodiment, the BTAS (102) may be communicatively coupled with other components, such as, for example, IP Telephone and provisioning servers. In an example embodiment, the IP PBX may communicate with the ESBC (356) via Session Initiation Protocol (SIP) technique. The enterprise may pertain to an entity including, but not limited to, an organization, a company, a business, an educational campus, an office campus, a shopping center, a residential area/community, and various other entities that may wish to avail the communication network by the service provider. In an embodiment, the communication network may be available only within a pre-defined zone (allowed zone) of the enterprise. Various other types of entities/provisions are possible.

The IMS server (106 of FIG. 1) may include one or more modules or components that may enable to perform one or more functions. For example, the IMS server may be an existing IMS core including components/modules handling various functions such as, Serving-Call Session Control Function (SCSCF) module (358), Interrogating Call Session Control Function (ICSCF) module (362), Proxy-Call Session Control Function (PCSCF) module (352). In an embodiment, the BTAS (102) may be integrated with a network of the IMS core and other application servers to provide a network service pertaining to, for example, a 4G/5G/6G network. For example, the other application server may include a Telephony Application Server (TAS) (360), which may be considered as a general component used in a communication network to provide telephony applications and additional multimedia functions. In another example, the other application server may include a Mobile number portability (MNP) server (324), which may provide number portability to users such as, for example, may allow retaining the same number upon a change in the service provider. Various other servers may be integrated into the BTAS enabled IMS implementation for enabling one or more services pertaining to the communication network or 4G/5G/6G network without departing from the scope of the ongoing description.

In reference to the components pertaining to the IMS, the SCSCF module (358) may be a primary node in the IMS server (106) responsible for session control. In an embodiment, a list of subscribers may be allocated to the respective SCSCF module (358) at the time of IMS registration in order to facilitate the routing of SIP messages as part of service establishment procedures. In operation, the SCSCF module (358) may enable downloading a subscriber profile from the Home Subscriber Server (HSS) (320) at the time of IMS registration. The ICSCF module (362) may be a key element in the IMS server (106) and may enable any request to be routed to an appropriate SCSCF module (358) from multiple SCSCFs within the network. The ICSCF module (362) may also interrogate the HSS (320) to obtain an address of the relevant SCSCF module (358) to process a SIP initiation request. As shown in FIG. 3, the PCSCF module (352) may act as an ingress and egress point to and from an IMS domain of the service provider with respect to the IMS client. The PCSCF module (352) may perform general functions, such as, for example, onward routing of registration and session requests to the correct nodes in the communication network, updating the SCSCF module (358), maintaining a secure connection with the UE (110), and other such functions. In an embodiment, the network device or BTAS (102) may be communicably coupled or be integrated with one or more functional components such as, for example, a Session Initiation Protocol (SIP) based application server. The SIP server may be built with features pertaining to the type of enterprise (356).

Further, as shown in FIG. 3, to provide various aspects of the network service (e.g., pertaining to 4G/5G/6G network), the components of the IMS server (106) (such as SCSCF, ICSCF module) may also include components/modules that pertain to other functions. For example, the components/modules may correspond to a Breakout Gateway Control Function (BGCF) module (318), a Media Gateway Control Function (MGCF) module (322), Interconnect Border Control Function (IBCF) (316), and other components/modules. In a general implementation, the BGCF module (318) may enable routing call signaling to and from the most appropriate SCSCF module (358). In the present implementation, the BGCF module (318) may enable routing of the call to respective BTAS (102) for universal Centrex services. In general, the MGCF module (322) may be a SIP endpoint that can interface with Security Gateway (SGW) and may also control resources in Media Gateway (MGW) (330). The IBCF module (316) may enable boundary control between various service provider networks, thus providing BTAS enabled IMS network security in terms of signaling information. The IMS server (106) may also include other existing components such as for example a component pertaining to Multimedia Resource Function (MRF) module (326). The MRF module (326) in conjunction with other components of the IMS server (106), may be responsible for executing various processing tasks on media streams associated with particular services. Further, as shown in FIG. 3, as the BTAS-IMS based implementation may be associated with Point of Interconnection (POI) (334), which may be the physical interface between media gateways of varying services providers or enterprises.

Figure 4:
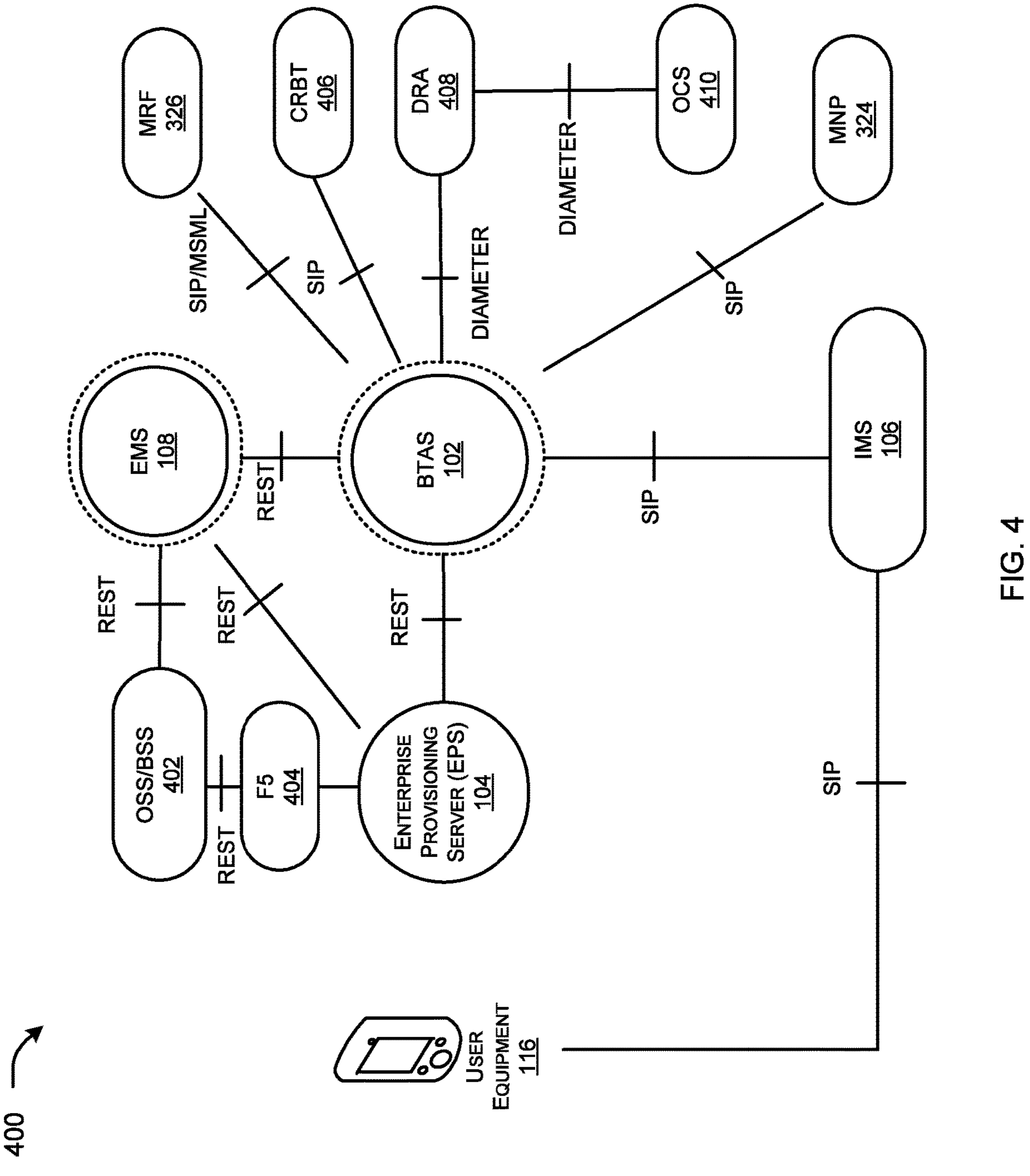
FIG. 4 illustrates an exemplary block diagram representation of a Business Telephony Application Server (BTAS) integration architecture, in accordance with an embodiment of the present disclosure.

FIG. 4 illustrates an exemplary block diagram representation of a Business Telephony Application Server (BTAS) integration architecture (400), in accordance with an embodiment of the present disclosure. The BTAS/network device (102) may be integrated or coupled with various hardware/software components or servers for enabling one or more functions pertaining to universal Centrex services. The BTAS (102) may be integrated with the IMS server (106) to enable the communication processing pertaining to the UE (116) within the enterprise (354) (shown in FIG. 3). In an example embodiment, the BTAS (102) may be integrated with the IMS server (106) to establish and control communication connections via network protocol including, but not limited to, the Session Initiation Protocol (SIP). As the communication may also involve the use of media in one or more forms, the BTAS (102) may integrate with Multimedia Resource Function (MRF) (326). The BTAS (102) may interface with Enterprise Provisioning Server (EPS) (104) via representational state transfer (REST) protocol to enable provisioning of service data.

In an example embodiment, the BTAS (102) may integrate with the MRF (326) to enable functions, such as, for example, media mixing, control of announcement, and other such purposes via network protocol including, but not limited to, Session Initiation Protocol-Media Server Markup Language (SIP-MSML). In an example embodiment, the BTAS (102) may be integrated or coupled with other components/services such as Mobile Number Portability (MNP) (324) (via SIP) for enabling number portability dipping. In another example embodiment, the BTAS (102) and the EPS (104) may be independently integrated or coupled with an element management system (EMS) (108) via REST. The EMS (108) may include hardware and software implementation for managing the five key aspects i.e., Fault, Configuration, Accounting, Performance, and Security (FCAPS) functionality via Representational State Transfer (REST) protocol to exchange messages pertaining to the key aspects that can use Hypertext Transfer Protocol (HTTP) to transport the messages. The EMS (108) may provide a foundation to implement Operations Support System (OSS) (402) or Business Support Systems (BSS) (402) based architecture that enables service providers to meet customer needs for example, for rapid deployment of services, to enable providing a satisfying quality of service requirements and other such services. The EMS (108) may interface with OSS/BSS (402) via REST protocol to enable a northbound interface for FCAPS data of BTAS (102)/EPS (104). The term northbound interface may relate to an interface that allows a particular component of a network to communicate with a higher-level component. The OSS/BSS (402) may interface with EPS (104) via REST protocol to enable functions such as, for example, service data management requests.

Further, as shown in FIG. 4, the BTAS (102) may be integrated or coupled with Diameter Routing Agent (DRA) (408) via diameter protocol, which may be a standard protocol for authentication, authorization, and accounting information in the IMS server (106) based network. The DRA diameter may be a functional element that may provide real-time routing capabilities to ensure that messages are routed among the correct elements in a network. The integration of BTAS (102) with the DRA (408) may enable integration with an Online Charging System (OCS) (410) for facilitating 'Ro' charging. The OCS (410) may be a system that allows a service provider to charge users or customers in real-time based on service usage, and wherein the Ro-charging pertains to a protocol that enables trigger to generate charging events. In an embodiment, the BTAS (102) may also be integrated with components pertaining to Customized Caller Ring Back Tone (CRBT) (406) for enabling personalized Ring Back Tone (RBT) at the stage of establishing the communication. For example, this may be mainly related to the RBT that may be played while connecting a call communication of the user device with the plurality of emergency services.

Figure 5:
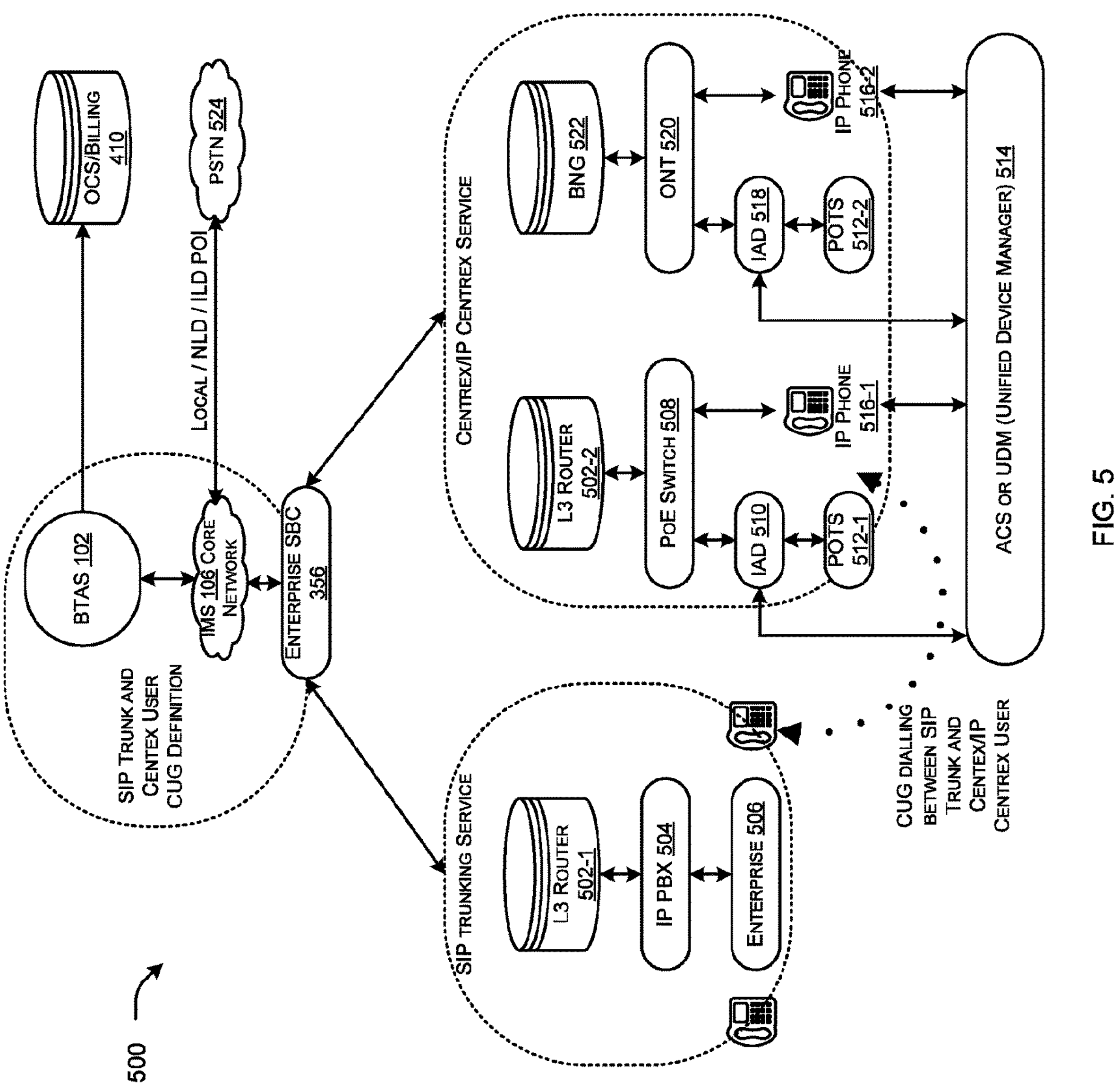
FIG. 5 illustrates an exemplary block diagram representation of universal Centrex service architecture, in accordance with an embodiment of the present disclosure.

FIG. 5 illustrates an exemplary block diagram representation of a universal Centrex service architecture (500), in accordance with an embodiment of the present disclosure. The universal Centrex service may be a value-added service over any of the existing voice services namely SIP trunk, IP Centrex, and society Centrex. The universal Centrex service may enable short digit dialing between Centrex/IP Centrex users and SIP trunking users, SIP trunking to SIP trunking users, and inter/intra circle Centrex/IP Centrex users within the same city or across the country. As shown in FIG. 5, the universal Centrex service architecture (500) may be access independent, wherein universal Centrex service may be based on one or more network operator's fixed-line IMS (106) core network with an additional element such as the Business Telephony Application Server (BTAS) (102) which holds all the Centrex specific user features and business logic.

As shown in FIG. 5, the universal Centrex architecture may include two services architectures such as SIP trunking service and Centrex/IP Centrex service. The SIP trunking service and Centrex/IP Centrex service may be combined with the underlying access network connectivity. An enterprise (506) of SIP trunking service may include IP PBX (504) and connect to ESBC 356 via an L3 router (502-1). The IP PBX (504) may be a private branch exchange (telephone switching system within an enterprise) that switches call between Voice over Internet Protocol (VOIP) users on local lines while allowing all users to share a certain number of external phone lines. Further, the Centrex/IP Centrex Service may include Plain Old Telephone Service (POTS) phones (512-1, 512-2), which are connected to Integrated Access Device (510, 518), respectively. The IAD (510, 518) may be a customer premise device that may provide access to Wide Area Networks (WAN) and the Internet. Specifically, the IAD (510, 518) may connect the POTS line at one side and provide IP connections on the other end. The User Equipment (UE) management and configuration may be based on the type of model with the type of network operator, who may need to enter into the market. The UE management and provisioning could become important if UE is to be managed by the network operator for universal Centrex service. Further, an Auto-Configuration system (ACS)/Unified Device Manager (UDM) (514) may be needed for UE auto-configuration such as IAD (510, 518) or IP phones (516-1, 516-2). The IP phones (516-1, 516-2) may be HD Audio and Video Phones. The IAD (510, 518) may be connected to a Power over Ethernet (POE) switch (508), and an Optical Network Terminal (ONT) (520), respectively. For instance, a Fiber to the x (FTTx)/Multiprotocol Label Switching (MPLS) access network may allow enterprise customers to get connected to operator network for accessing respective services. However, the customer premises equipment such as the ONT (520) may need to be installed. A home gateway or the ONT (520) may be a part of the existing FLP service offerings to the residential users and the same could be used for new or existing customers requiring society Centrex services at the residential complex level. The POE switch (508), and the ONT (520) may be communicatively connected to an L3 router (502-2), and a Broadband Network Gateway (BNG) (522), respectively. The L3 router (502-1, 502-2) may be a customer premises equipment for enterprise customers, which may need to be installed at customer premises as part of Multiprotocol Label Switching (MPLS) Ethernet access for providing them access to the operator network.

The Enterprise SBC (ESBC) (356) may be deployed at pre-defined circles across the country, which may have logical SIP connections with the SIP trunking service and Centrex/IP Centrex customers. The ESBC may forward the call traffic to IMS (106) core network which may be common IMS architecture being deployed in a network operator environment. For example, BTAS (102) may be deployed in 8 super core locations. Each super core location may be handling traffic of multiple circles which may be parented to a particular super core. By virtue of universal Centrex, it may be possible to migrate POTS phone (512-1, 512-2) over IP without incurring the cost of PBX, and also customers can enjoy the benefit of dialing between IP PBX (504) and new universal Centrex users seamlessly. In such a case, the service provider may own and manages all the communications equipment and software necessary to implement the Centrex service (Virtual PBX Service for enterprise) and then sells various services to the customer. Universal Centrex may also enable customers to make short digit calling between two different setups such as an IP-based PBX which is connected with the service provider through SIP trunking service and a Centrex/IP Centrex which connects with the service provider as Centrex service. The universal Centrex service suite may offer many business features of Centrex service and will also cover features of SIP trunking service.

In an embodiment, the universal Centrex may support short digit dialing (using short codes) between Centrex/IP Centrex user to SIP trunking user, and SIP trunking to SIP trunking or Inter/Intra-circle Centrex/IP Centrex user. For example, the short code may include private numbering patterns (e.g., 2/3/4/5/6 digits) on a whole of the country basis. The short digit dial may not have numbers similar to emergency numbers and L1 codes. The universal Centrex may merge multiple SIP trunks with one Pilot number (same location, same authorized signatory, same billing identity). Further, existing as well as new setups can be brought under one Centrex group. A configuration of the private numbering patterns may be provided via self-care (including short digit dialing and access codes). The universal Centrex may support overlap of short digit dialing between Centrex/IP Centrex user to SIP trunking user and SIP trunking to SIP trunking or Inter/Intra-circle Centrex/IP Centrex user. The universal Centrex allows CUG dialing between SIP trunking user device and Centrex/IP Centrex user device.

In an alternate embodiment, an inter short code such as local short may be dialed by the first user and may be processed locally using PBX/IP PBX or Centrex, without transmitting the inter short code to BTAS (102) for processing. The inter short code may not include any prefix. When the short code includes a prefix, then the short code along with the prefix may be transmitted to the BTAS (102) for processing the call. Further, in an embodiment, the charges for IP PBX and Centrex are the same as the normal charge rates (i.e., IP PBX to Centrex rates) which used to be charged without the universal Centrex service. However, the charges may be different for the proposed universal Centrex service.

Figure 6:
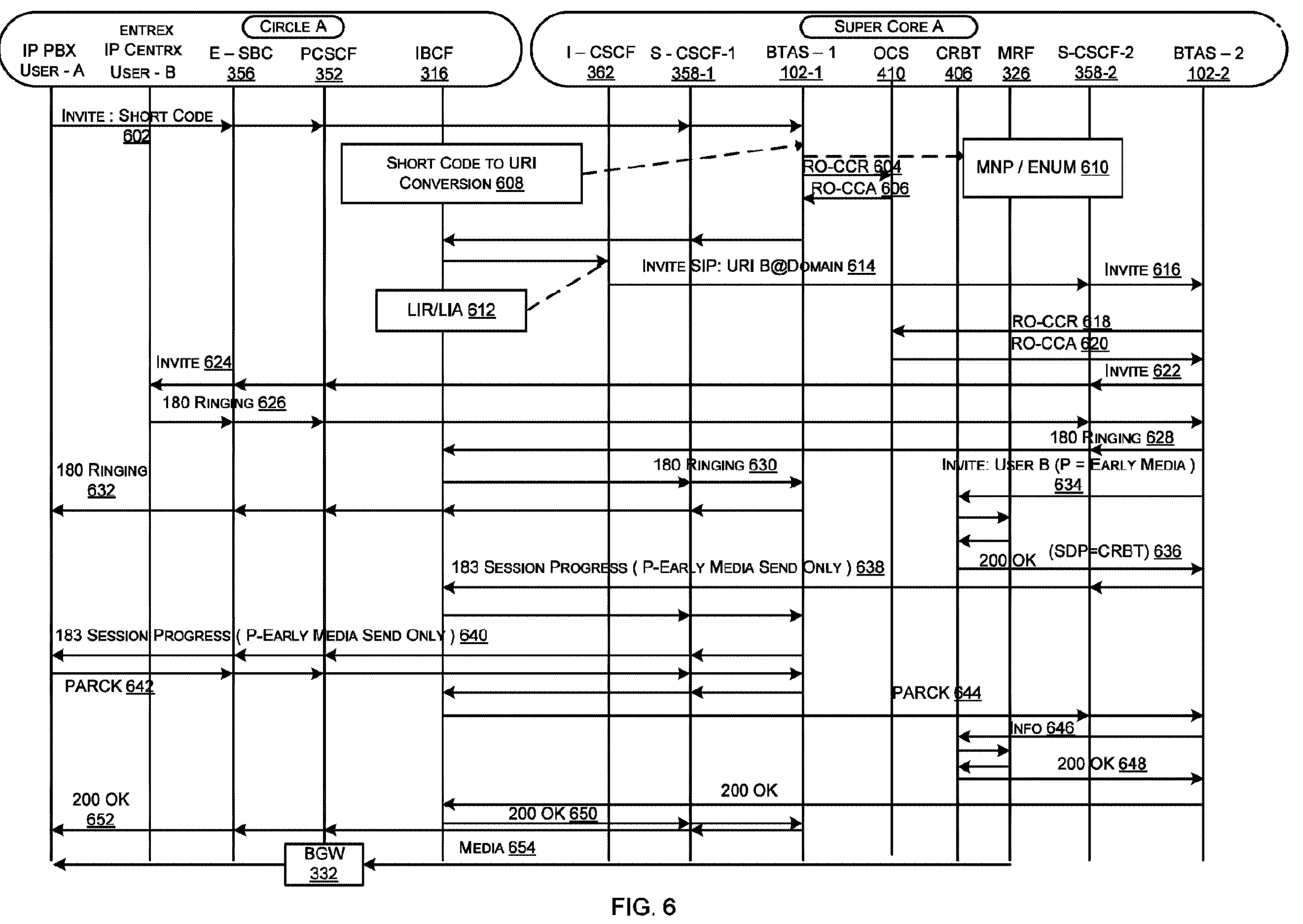
FIG. 6 illustrates an exemplary sequence diagram for universal Centrex Intra/inter-enterprise call flow between Session Initiation Protocol (SIP) trunking and Centrex/IP Centrex user, in accordance with an embodiment of the present disclosure.

FIG. 6 illustrates an exemplary sequence diagram for universal Centrex Intra/inter-enterprise call flow between Session Initiation Protocol (SIP) trunking and Centrex/IP Centrex user, in accordance with an embodiment of the present disclosure.

As shown in FIG. 6, a circle 'A' may include an IP PBX (SIP trunking device) associated with the user 'A' such as the first user, and Centrex/IP Centrex associated with user 'B' such as the second user. Further, the circle 'A' may include the ESBC (356), the PCSCF (352), and the IBCF (316). Further, a super core 'A' may include the ICSCF (362), the SCSCF-1 (358-1), the BTAS-1 (102-1), the OCS (410), the CRBT (406), the MRF (326), the SCSCF-2 (358-2), and the BTAS-2 (102-2).

At step (602), an INVITE short code is transmitted from IP PBX User A device to BTAS-1 (102-1) via ESBC (356), PCSCF (352), and the SCSCF (358-1). At step (604), the BTAS-1 (102-1) may trigger charging to OCS (410) using a Credit-Control-Request (CCR), and at step (606) the OCS (410) may transmit back a Credit-Control-Answer (CCA) to the BTAS-1 (102-1). At step (608), the BTAS-1 (102-1) may convert short code to the URI (i.e., full number).

At step (610), the BTAS-1 (102-1) may perform at least one of an E. 164 number to URI mapping (ENUM) and a Mobile Number Portability (MNP) for the URI. At step (612), upon receiving the INVITE, the BTAS-1 (102-1) may trigger ICSCF (362) to query the HSS (not shown in FIG. 6) to discover the assigned S-CSCF-1 (358-1) for the user A, through a Location-Info-Request (LIR) Diameter request. The HSS then returns the assigned S-CSCF-1 (358-1) using the mapping in the answer through Location-Info-Answer (LIA).

At step (614), the ICSCF (362) may send SIP INVITE containing URI of user B, to the SCSCF-2 (358-2), then at step (616), the SCSCF-2 (358-2) may send the SIP INVITE to BTAS-2 (102-2). At step (618), the BTAS-2 (102-2) may trigger charging to OCS (410) using a Credit-Control-Request (CCR), and at step (620) the OCS (410) may transmit back a Credit-Control-Answer (CCA) to the BTAS-2 (102-2).

At step (622), the BTAS-2 (102-2) may forward the SIP INVITE to the SCSCF-2 (358-2). At step (624), the SCSCF-2 (358-2) may transfer the SIP INVITE to the PCSCF (352), then the PCSCF (352), transfers the SIP INVITE to the ESBC (356). Further, the ESBC (356) may transmit the SIP INVITE to the user B device.

At step (626), the user B device returns ringing using 180 ringing messages to the ESBC (356), then the ESBC (356) sends the 180-ringing message to the PCSCF (352). Further, the PCSCF (352) transmits the 180-ringing message to the SCSCF-2 (358-2). Further, the SCSCF-2 (358-2) transmits the 180-ringing message to the BTAS-2 (102-2).

At step (628), the BTAS-2 (102-2) transmits the 180-ringing message to the SCSCF-2 (358-2) and the SCSCF-2 (358-2) transmits the 180-ringing message to the IBCF (316). At step (630), the IBCF (316) transmits the 180-ringing message to the SCSCF-1 (358-1), then the SCSCF-1 (358-1) transmits the 180-ringing message to the BTAS-1 (102-1).

At step (632), the BTAS-1 (102-1) transmits the 180-ringing message to the user A device via the SCSCF-1 (358-1), IBCF (316), PCSCF (352), and the ESBC (356). At step (634), the BTAS-2 (102-2) sends an INVITE message containing message user B (P=early media) to the CRBT (406). Early media is the ability of two SIP User Agents to communicate before a SIP call is established. Typically, this scenario occurs when the called party is a PSTN gateway. Before the call is set up, the gateway might provide in-band tones or announcements that inform the caller of the call's progress. The P-Early-Media header is used for requesting and authorizing requests for backward and/or forward early media. The P-Early-Media header field in an INVITE request contains the "supported" parameter.

At step (636), the CRBT (406) may send 200 ok messages along with a Session Description Protocol (SDP) for CRBT, to the BTAS-2 (102-2). At step (638), the BTAS-2 (102-2) may transmit 183 sessions in progress messages along with P-early-media send only message to the IBCF 316, via the SCSCF-2 (358-2), and then to BTAS-1 (102-1) via the SCSCF-1 (358-1). The value "send only" indicates a request for authorization of early media from the SCSCF-1 (358-1) towards the BTAS-1 (102-1) (backward early media), and not in the other direction.

At step (640), the BTAS-1 (102-1) transmits the 183 sessions in progress message to the SCSCF-1 (358-1), then the SCSCF-1 (358-1) sends the 183 sessions in progress message to the ESBC (356). Further, the ESBC (356) transmits the 183 sessions in progress message to the user A device.

At step (642), the user A device transmits a Provisional Response Acknowledgement (PRACK) message to the ESBC (356), and then the ESBC (356) transmits the PRACK to the PSCSF (352). Further, the PSCSF (352) transmits the PRACK to SCSCF-1 (358-1), then the SCSCF-1 (358-1) transmits the PRACK to the BTAS-1 (102-1). For example, in a SIP inter-working scenario, the 180 and 183 messages mustn't be missed, hence PRACK is transmitted. Further, the BTAS-1 (102-1) transmits the PRACK to the IBCF (316) via the SCSCF-1 (358-1).

At step (644), the PRACK is transmitted from the IBCF (316) to the SCSCF-2 (358-2), and then the SCSCF-2 (358-2) transmits the PRACK message to the BTAS-2 (102-2). At step (646), the BTAS-2 (102-2) transmits SDP information contained in the PRACK message, to the CRBT (406). At step (648), the CRBT (406) sends 200 OK messages to the BTAS-2 (102-2). Further, the BTAS-2 (102-2) transmits the 200 OK messages to the IBCF (316).

At step (650), the 200 OK messages are transmitted from the IBCF (316) to the BTAS-1 (102-1) via the SCSCF-1 (358-1). At step (652), the BTAS-1 (102-1) forwards the 200 OK messages to the user A device via the SCSCF-1 (358-1), PCSCF (352), and the ESBC (356). At step (654), the MRF (326) transmits the media via the BGW (332) to the user device 'A'.

Figure 7:
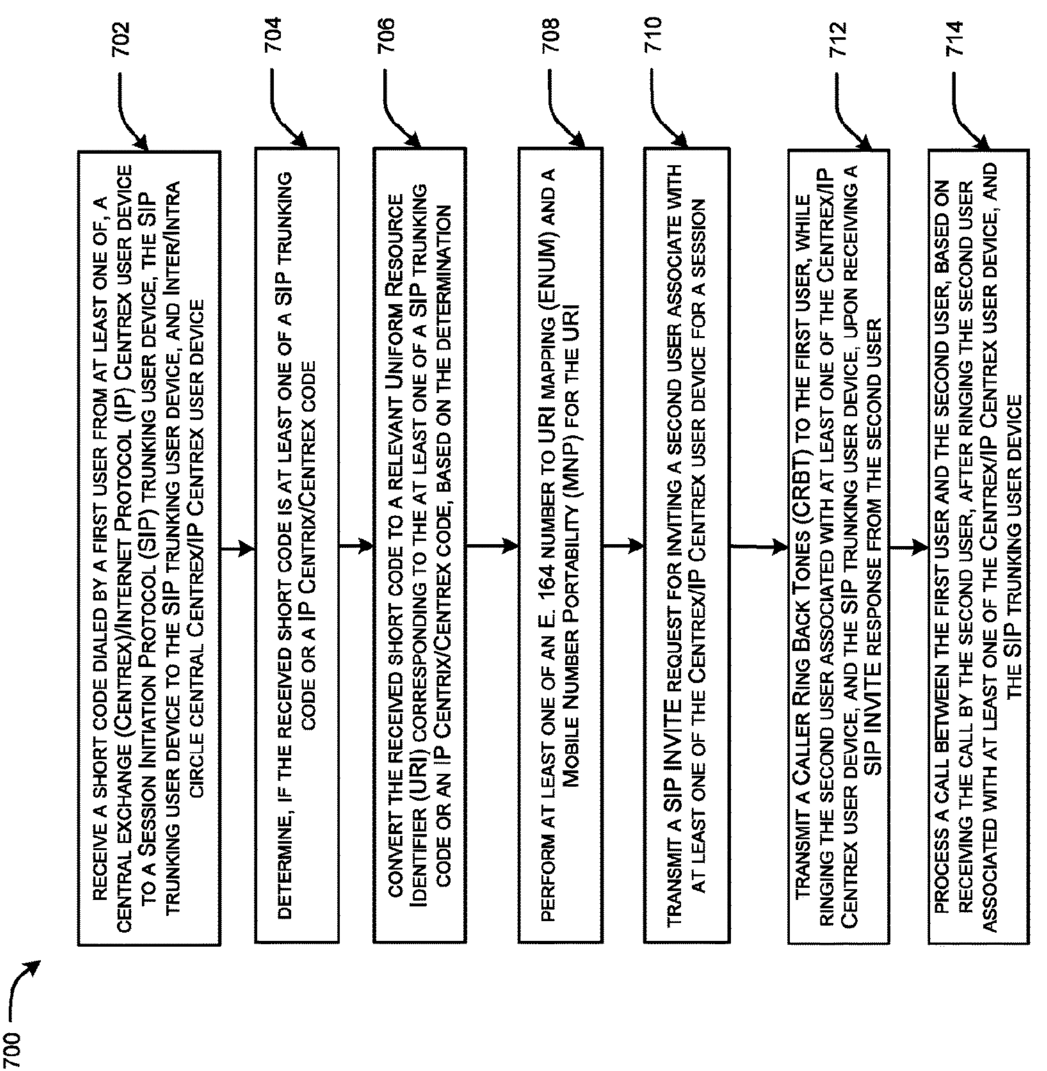
FIG. 7 illustrates an exemplary flow chart for a method of universal Central exchange (Centrex), in accordance with an embodiment of the present disclosure.

FIG. 7 illustrates an exemplary flow chart for a method (700) of universal Central exchange (Centrex), in accordance with an embodiment of the present disclosure.

At block (702), the method (700) may include receiving, by the processor (202) associated with a network device (102), a short code dialed by a first user from at least one of, a first user device (110) to a second user device (110), the second user device (110) to the second user device (110), and Inter/Intra circle first user device (110). The second user device (110) is communicatively coupled to one or more Internet Protocol Private Branch Exchange (IP PBX) (504).

At block (704), the method (700) may include determining, by the processor (202), if the received short code is at least one of a SIP trunking code or an IP Centrix/Centrex code.

At block (706) the method (700) may include converting, by the processor (202), the received short code to a relevant Uniform Resource Identifier (URI) corresponding to the at least one of a SIP trunking code or an IP Centrix/Centrex code, based on the determination, wherein the short code corresponds to at least one of a fixed-line and a mobile number.

At block (708), the method (700) may include performing, by the processor (202), at least one of an E. 164 number to URI mapping (ENUM) and a Mobile Number Portability (MNP) for the URI.

At block (710) the method (700) may include transmitting, by the processor (202), a SIP INVITE request for inviting a second user to associate with at least one of the first user devices (110) for a session, wherein the SIP INVITE comprises a URI address along with domain name associated with the second user.

At block (712) the method (700) may include transmitting, by the processor (202), a Caller Ring Back Tones (CRBT) (406) to the first user, while ringing the second user associated with at least one of the first user device (110), and the second user device (110), upon receiving a SIP INVITE response from the second user.

At block (714) the method (700) may include processing, by the processor (202), a call between the first user and the second user, based on receiving the call by the second user, after ringing the second user associated with at least one of the first (110), and the second user device (110).

Figure 8:
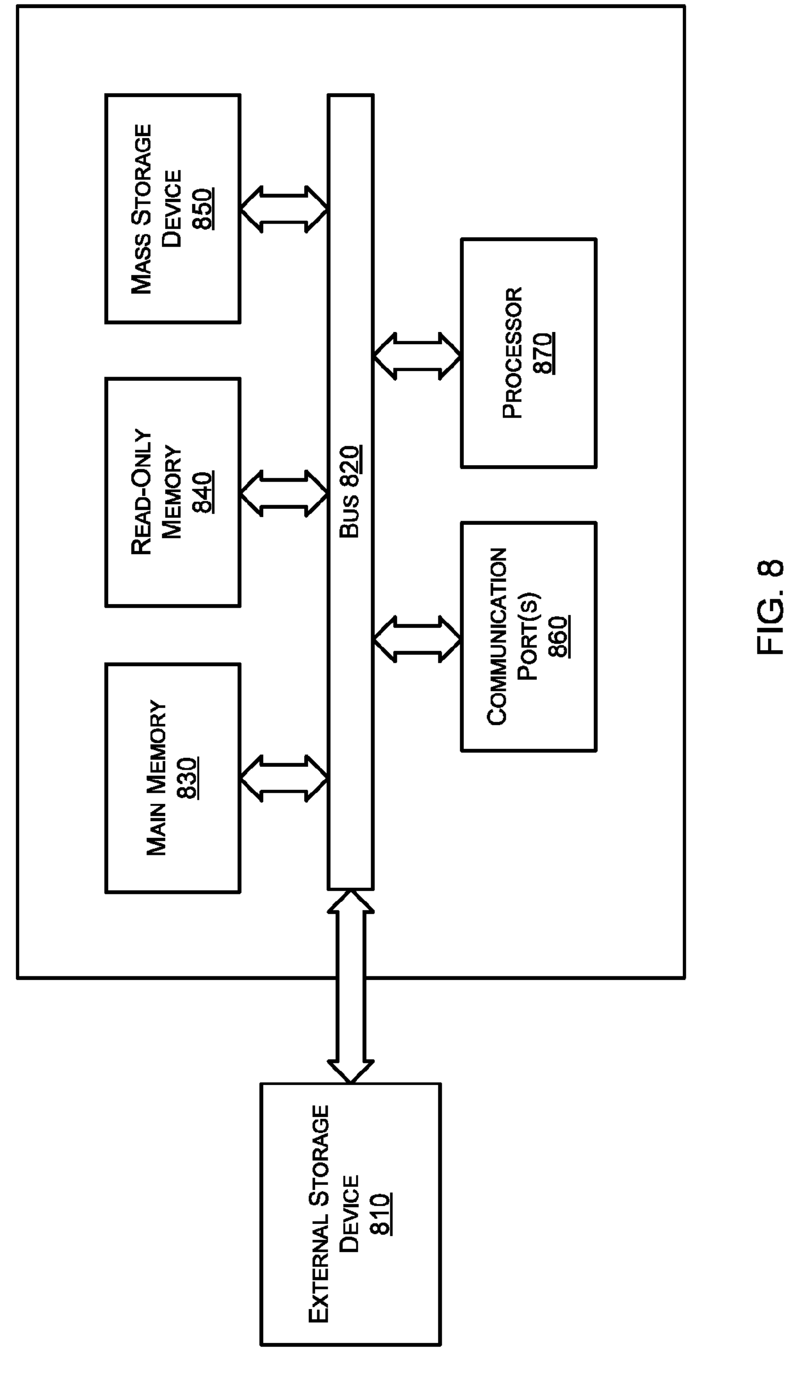
FIG. 8 illustrates an exemplary computer system in which or with which embodiments of the present invention can be utilized, in accordance with embodiments of the present disclosure.

FIG. 8 illustrates an exemplary computer system (800) in which or with which embodiments of the present invention can be utilized, in accordance with embodiments of the present disclosure.

As shown in FIG. 8, the computer system (800) can include an external storage device (810), a bus (820), a main memory (830), a read-only memory (840), a mass storage device (850), communication port (860), and a processor (870). A person skilled in the art will appreciate that the computer system may include more than one processor and communication ports. Processor (870) may include various modules associated with embodiments of the present invention. Communication port (860) can be any of an RS-232 port for use with a modem-based dialup connection, a 10/100 Ethernet port, a Gigabit, or 10 Gigabit port using copper or fiber, a serial port, a parallel port, or other existing or future ports. Communication port (860) may be chosen depending on a network, such as a Local Area Network (LAN), Wide Area Network (WAN), or any network to which the computer system connects. Memory (830) can be Random Access Memory (RAM), or any other dynamic storage device commonly known in the art. Read-only memory (840) can be any static storage device(s) e.g., but not limited to, a Programmable Read-Only Memory (PROM) chips for storing static information e.g., start-up or BIOS instructions for the processor (870). Mass storage (850) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces).

Bus (820) communicatively coupled processor(s) (870) with the other memory, storage, and communication blocks. Bus (820) can be, e.g., a Peripheral Component Interconnect (PCI)/PCI Extended (PCI-X) bus, Small Computer System Interface (SCSI), USB or the like, for connecting expansion cards, drives, and other subsystems as well as other buses, such a front side bus (FSB), which connects processor (870) to a software system.

Optionally, operator and administrative interfaces, e.g., a display, keyboard, and a cursor control device, may also be coupled to the bus (820) to support direct operator interaction with a computer system. Other operator and administrative interfaces can be provided through network connections connected through a communication port (860). The external storage device (810) can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

Various embodiments of the present disclosure provide a network device and a method for Universal Central exchange (Centrex). The present disclosure provides a network device which would be integrated with an operator's Internet protocol Multimedia Subsystem (IMS) core network. The present disclosure provides a universal Centrex service as a value-added service over any of the existing voice services namely SIP Trunk, Centrex, IP Centrex, and society Centrex. The present disclosure enables the universal Centrex service with a short digit dialing between Centrex/IP Centrex users and SIP trunking users, SIP trunking to SIP trunking users, and inter/intra circle Centrex/IP Centrex users within same city or across the nation. The present disclosure enables migration of a Plain Old Telephone Service (POTS) phone over IP without incurring the cost of Private Branch Exchange (PBX) and also customers can enjoy the benefit of dialing between Internet Protocol (IP) PBX and new universal Centrex users. The present disclosure supports short digit dialing between Centrex/IP Centrex user to SIP trunking user and SIP trunking to SIP trunking or Inter/Intra-circle Centrex/IP Centrex user. The present disclosure enables private numbering patterns (2/3/4/5/6 digit) country-wide. The present disclosure merges multiple SIP trunks with one pilot number (same location, same authorized signatory, same billing identity, and the like). The present disclosure enables an existing setup as well as new setups under one Centrex group.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as a limitation.

We claim:

1. A network device (102) for a universal central exchange (Centrex), the network device (102) comprising:

a processor (202);

a memory (204) coupled to the processor (202), wherein the memory (204) comprises processor-executable instructions, which, on execution, cause the processor (202) to:

receive a short code dialed by a first user from at least one of, a first user device (110) to a second user device (110), the second user device (110) to the second user device (110), and Inter/Intra circle first user device (110) used by the first user, wherein the second user device (110) is a single device distinct from the first user device (110) and is communicatively coupled to one or more Internet Protocol Private Branch Exchange (IP PBX) (504);

determine, if the received short code is at least one of a SIP trunking code or an IP Centrix/Centrex code;

convert the received short code to a relevant Uniform Resource Identifier (URI) corresponding to the at least one of a SIP trunking code or an IP Centrix/Centrex code, based on the determination, wherein the short code corresponds to at least one of a fixed-line and a mobile number;

for the URI, perform at least one of: an E. 164 number to URI mapping (ENUM) and a Mobile Number Portability (MNP);

transmit a SIP INVITE request for inviting a second user to associate with at least one of the first user devices (110) for a session, wherein the SIP INVITE comprises a URI address along with domain name associated with the second user;

transmit a Caller Ring Back Tones (CRBT) (406) to the first user, while ringing the second user associated with at least one of the first user devices (110), and the second user device (110), upon receiving a SIP INVITE response from the second user; and process a call between the first user and the second user, based on receiving the call by the second user, after ringing the second user associated with at least one of the first user devices (110), and the second user device (110).

2. The network device (102) as claimed in claim 1, wherein the short code is received from at least one of the first user device (110), and the second user device (110) via an Enterprise Session Border Controller (ESBC) (356), Proxy-Call Session Control Function (PCSCF), a Serving-Call Session Control Function (SCSCF) (358), wherein the ESBC (356) forwards the traffic to Internet protocol Multimedia Subsystem (IMS) (106) core network, which is common IMS architecture being deployed in the operator environment.

3. The network device (102) as claimed in claim 1, wherein at least one of the SIP trunking codes or the IP Centrix/Centrex code is determined based on prefix associated with the short code dialed by the first user.

4. The network device (102) as claimed in claim 1, wherein the call is originated from an Enterprise Session Border Controller (ESBC) (356), and the network device (102) holds all numbers configuration related to SIP trunk, Centrex/P Centrex, and a respective Closed User Group (CUG) definition.

5. The network device (102) as claimed in claim 1, wherein the processor (202) is further configured to merge multiple second user devices (110) with one pilot number, wherein the pilot number is associated with the same location, same authorized signatory, and same billing identity.

6. The network device (102) as claimed in claim 1, wherein the processor (202) is further configured to transmit a Credit-Control-Request (CCR) to an Online Charging Server (OCS) (410), and receive back a Credit-Control-Answer (CCA) from the OCS (410), upon performing at least one of the ENUM and the MNP for the URI, and after SIP INVITE to the second user associated with at least one of the first user device (110), and the second user device (110).

7. The network device (102) as claimed in claim 6, wherein the processor (202) is further configured to:

transmit a Location Information Request (LIR), via the SCSCF (358), to an Interconnect Border Control Function (BCF) (316) associated with at least one of the first user devices (110), and the second user device (110) of the first user, for first user information, upon receiving the CCA from the OCS (410); and receive a Location Information Answer (LIA) from the IBCF (316) associated with at least one of the first user devices (110), the second user device (110) of the first user, with the first user information, via an Interrogating Call Session Control Function (ICSCF) (362).

8. The network device (102) as claimed in claim 1, wherein the first user device (110) corresponds to a central exchange (Centrex)/Internet Protocol (IP) Centrex user device, and the second user device (110) corresponds to a Session Initiation Protocol (SIP) trunking user device.

9. A method of a universal central exchange (Centrex), the method comprising:

receiving, by a processor (202) associated with a network device (102), a short code dialed by a first user from at least one of, a first user device (110) to a second user device (110), the second user device (110) to the second user device (110), and Inter/Intra circle first user device (110) used by the first user, wherein the second user device (110) is a single device distinct from the first user device (110) and is communicatively coupled to one or more Internet Protocol Private Branch Exchange (IP PBX) (504);

determining, by the processor (202), if the received short code is at least one of a SIP trunking code or an IP Centrix/Centrex code;

converting, by the processor (202), the received short code to a relevant Uniform Resource Identifier (URI) corresponding to the at least one of a SIP trunking code or an IP Centrix/Centrex code, based on the determination, wherein the short code corresponds to at least one of a fixed-line and a mobile number;

for the URI, performing, by the processor (202), at least one of an: E. 164 number to URI mapping (ENUM) and a Mobile Number Portability (MNP);

transmitting, by the processor (202), a SIP INVITE request for inviting a second user associated with at least one of the first user devices (110) for a session, wherein the SIP INVITE comprises a URI address along with a domain name associated with the second user;

transmitting, by the processor (202), a Caller Ring Back Tones (CRBT) (406) to the first user, while ringing the second user associated with at least one of the first user devices (110), and the second user device (110), upon receiving a SIP INVITE response from the second user; and processing, by the processor (202), a call between the first user and the second user, based on receiving the call by the second user, after ringing the second user associated with at least one of the first user devices (110), and the second user device (110).

10. The method as claimed in claim 9, wherein the short code is received from at least one of the first user device (110), and the second user device (110) via an Enterprise Session Border Controller (ESBC) (356), Proxy-Call Session Control Function (PCSCF), a Serving-Call Session Control Function (SCSCF) (358), wherein the ESBC (356) forwards the traffic to Internet protocol Multimedia Subsystem (IMS) (106) core network, which is common IMS architecture being deployed in the operator environment.

11. The method as claimed in claim 9, wherein at least one of the SIP trunking code or the IP Centrix/Centrex code is determined based on prefix associated with the short code dialed by the first user.

12. The method as claimed in claim 9, wherein the call is originated from an Enterprise Session Border Controller (ESBC) (356), and the network device (102) holds all numbers configuration related to SIP trunk, Centrex/IP Centrex, and a respective Closed User Group (CUG) definition.

13. The method as claimed in claim 9, wherein the method further comprises merging, by the processor (202), multiple second user devices (110) with one pilot number, wherein the pilot number is associated with the same location, same authorized signatory, and same billing identity.

14. The method as claimed in claim 9, wherein the method further comprises transmitting, by the processor (202), a Credit-Control-Request (CCR) to an Online Charging Server (OCS) (410), and receiving back a Credit-Control-Answer (CCA) from the OCS (410), upon performing at least one of the ENUM and the MNP for the URI, and after SIP INVITE to the second user associated with at least one of the first user device (110), and the second user device (110).

15. The method as claimed in claim 14, wherein the method further comprises:

transmitting, by the processor (202), a Location Information Request (LIR), via the SCSCF (358), to an Interconnect Border Control Function (IBCF) (316) associated with at least one of the first user devices (110), and the second user device (110) of the first user, for first user information, upon receiving the CCA from the OCS (410); and receiving, by the processor (202), a Location Information Answer (LIA) from the IBCF (316) associated with at least one of the first user devices (110), the second user device (110) of the first user, with the first user information, via an Interrogating Call Session Control Function (ICSCF) (362).

16. The method as claimed in claim 9, wherein the first user device (110) corresponds to a central exchange (Centrex)/Internet Protocol (IP) Centrex user device, and the second user device (110) corresponds to a Session Initiation Protocol (SP) trunking user device.

17. A user equipment (110) for a universal central exchange, the user equipment (110) comprising:

a processor coupled to a processor (202) of a network device (102); and a memory coupled to the processor, wherein the memory comprises processor-executable instructions, which on execution, cause the user equipment (110) to:

transmit a short code dialed by a first user associated with the user equipment (110) to a second user associated with a second user equipment, wherein the second user equipment is communicatively coupled to one or more Internet Protocol Private Branch Exchange (IP PBX) (504);

receive a Caller Ring Back Tone (CRBT) (406); and process a call between the first user and the second user.

18. A non-transitory computer-readable medium comprising processor-executable instructions that cause a processor to:

receive a short code dialed by a first user from at least one of:

a first user device (110) to a second user device (110), the second user device (110) to the second user device (110), and Inter/Intra circle of the first user device (110) used by the first user, wherein the second user device (110) is a single device distinct from the first user device (110) and is communicatively coupled to one or more Internet Protocol Private Branch Exchange (IP PBX) (504);

determine if the received short code is at least one of: a Session Initiation Protocol (SIP) trunking code or an Internet Protocol (IP) Centrix/Centrex code;

convert the received short code to a relevant Uniform Resource Identifier (URI) corresponding to the at least one of: the SIP trunking code or the IP Centrix/Centrex code, based on the determination, wherein the short code corresponds to at least one of: a fixed line and a mobile number;

for the URI, perform at least one of: an E. 164 number to URI mapping (ENUM) and a Mobile Number Portability (MNP);

transmit an SIP INVITE request for inviting a second user to associate with at least one of the first user devices (110) for a session, wherein the SIP INVITE comprises a URI address along with domain name associated with the second user;

transmit a Caller Ring Back Tone (CRBT) (406) to the first user, while ringing the second user associated with at least one of the first user device (110) and the second user device (110), upon receiving an SIP INVITE response from the second user; and process a call between the first user and the second user, based on receiving the call by the second user, after ringing the second user associated with at least one of the first user device (110) and the second user device (110).

* * * * *